(12) United States Patent
Miyakawa

(10) Patent No.: US 8,872,942 B2
(45) Date of Patent: Oct. 28, 2014

(54) IMAGING DEVICE

(75) Inventor: Yoshiaki Miyakawa, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/427,050

(22) Filed: Mar. 22, 2012

(65) Prior Publication Data

US 2012/0249854 A1 Oct. 4, 2012

(30) Foreign Application Priority Data

Mar. 29, 2011 (JP) ................................ 2011-071690
Jan. 23, 2012 (JP) ................................ 2012-010684

(51) Int. Cl.
*H04N 5/262* (2006.01)
*H04N 5/232* (2006.01)

(52) U.S. Cl.
CPC ................................. *H04N 5/23212* (2013.01)
USPC .................... 348/239; 348/222.1; 348/333.01

(58) Field of Classification Search
CPC .................................................... H04N 5/262
USPC ............ 348/333.01–333.12, 345, 346, 218.1, 348/220.1, 208.12, 326, 239, 222.1; 382/255; 396/79, 80, 82, 89, 91, 102, 396/103, 104, 121, 151; 715/802, 767, 255, 715/723, 732
See application file for complete search history.

(56) References Cited

U.S. PATENT DOCUMENTS

2003/0025821 A1* 2/2003 Bean et al. .................... 348/345
2006/0007341 A1* 1/2006 Nakamura et al. ....... 348/333.05

FOREIGN PATENT DOCUMENTS

| JP | A-9-83855 | 3/1997 |
| JP | A-2001-211353 | 8/2001 |
| JP | A-2002-176613 | 6/2002 |
| JP | A-2002-290831 | 10/2002 |
| JP | A-2006-25310 | 1/2006 |

OTHER PUBLICATIONS

Japanese Office Action issued in Japanese Patent Application No. 2012-010684 dated Jan. 29, 2013 (w/translation).
Mar. 10, 2014 Office Action issued in Chinese Patent Application No. 201210088853.6 (with translation).

* cited by examiner

*Primary Examiner* — Tuan Ho
(74) *Attorney, Agent, or Firm* — Oliff PLC

(57) ABSTRACT

The imaging device of the present invention is provided with: an imaging sensor that captures subject light; a display unit that displays a through-image based on an imaging signal from the imaging sensor; a movie image generation unit that generates, on the basis of the imaging signal from the imaging sensor, at least two movie images each focused to at least two different regions set in the through-image displayed on the display unit; an image processing unit that performs image processing in linking portions of each of the movie images in order to link the at least two movie images generated by the movie image generation unit and generate compiled movie images; and a display control unit that controls the display unit to display the compiled movie images.

12 Claims, 20 Drawing Sheets

IMAGING DEVICE

CROSS-REFERENCE TO RELATED APPLICATIONS

The disclosures of the following priority applications are herein incorporated by reference:

Japanese Patent Application No. 2011-071690, filed on Mar. 29, 2011; and

Japanese Patent Application No. 2012-010684, filed on Jan. 23, 2012.

TECHNICAL FIELD

The present invention relates to an imaging device capable of recording movie images.

BACKGROUND ART

There has been proposed an image processing device for acquiring a near-focus image and a far-focus image at different focus positions taken by a digital camera; processing the acquired near-focus image and far-focus image to adjust the blurring expression; creating a plurality of changing-focus images in which the focus position gradually changes from the focus position of the near-focus image to the focus position of the far-focus image, on the basis of the processing to adjust the blurring expression; and creating an image file of movie images in which the near-focus image, the plurality of changing-focus images, and the far-focus image are concatenated as respective frame images (e.g., see Patent Document 1).

CITATION LIST

Patent Document

Patent Document 1: Japanese Unexamined Patent Application Publication No. 2002-290831

SUMMARY OF INVENTION

Technical Problem

However, in the prior art described above, generating the movie image file involves processing to synthesize two still images in order to generate each of the respective frame images constituting the movie image file, but the subject of each frame serving as a movie image lacks movement, and the unsatisfactory impression cannot be wiped away in movie image playback. In a case where movie images are taken, there also is a desire for a technology capable of acquiring movie images having an impressive visual effect such as movie images where the focus position changes gradually from a near focus to a far focus, without the need to perform the synthesis processing as described above. However, advanced operating technology is needed in a case where a user wishes to manually operate a video camera or the like to shoot movie images having such an impressive visual effect as described above.

It is an object of the present invention to provide an imaging device capable of readily creating movie image data of movie images having an impressive visual effect.

Solution to Problem

The imaging device of the present invention is characterized by comprising: an imaging sensor that captures subject light; a display unit that displays a through-image based on an imaging signal from the imaging sensor; a movie image generation unit that generates, on the basis of the imaging signal from the imaging sensor, at least two movie images each focused to at least two different regions set in the through-image displayed on the display unit; an image processing unit that performs image processing in linking portions of each of the movie images in order to link the at least two movie images generated by the movie image generation unit and generate compiled movie images; and a display control unit that controls the display unit to display the compiled movie images.

Advantageous Effects of Invention

According to the imaging device of the present invention, it is possible to readily create movie image data of movie images having an impressive visual effect.

DESCRIPTION OF EMBODIMENTS

Figure 1:
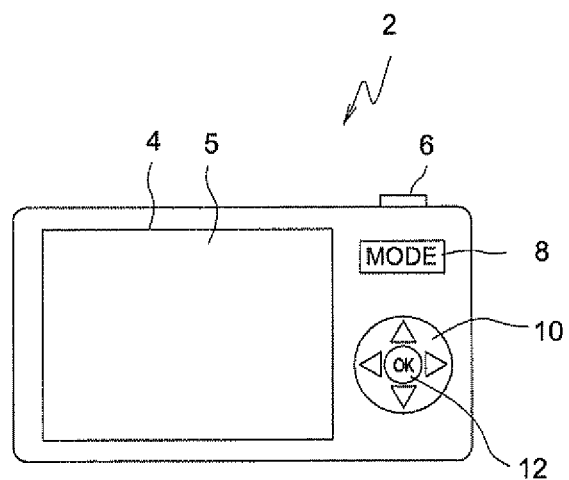
FIG. 1 is a drawing illustrating a back surface of an electronic camera according to a first embodiment.

The following is a description of an electronic camera serving as an imaging device according to a first embodiment of the present invention, with reference to the accompanying drawings. FIG. 1 is a drawing illustrating the back surface of an electronic camera 2 according to the first embodiment. As illustrated in FIG. 1, the back surface of the electronic camera 2 is provided with a display unit 4 constituted of an LCD or the like. The surface of the display unit 4 is provided with a touch panel 5. The display unit 4 displays a through-image based on an imaging signal from an imaging sensor 22 (described later) or a still image or movie images based on image data recorded in a recording medium 28 (described later). The touch panel 5 is an electrostatic capacitance-type or other touch panel, which detects a position or region of the display unit 4 with which the finger of a user has been brought into contact, and outputs the detection results to a control unit 20 (described later) (see FIG. 2).

The back surface of the electronic camera 2 is further provided with: a mode button 8 that changes the imaging mode and the like; a keypad 10 which is operated to select menu items or the like and when various settings are being made; and an OK button 12 that confirms an operation to select menu items or the like and to make various settings. The upper surface of the electronic camera 2 is provided with a shutter button 6 that commands that a still image or movie images be taken. Furthermore, the front surface of the electronic camera 2 is provided with an imaging lens 16 (see FIG. 2).

Figure 2:
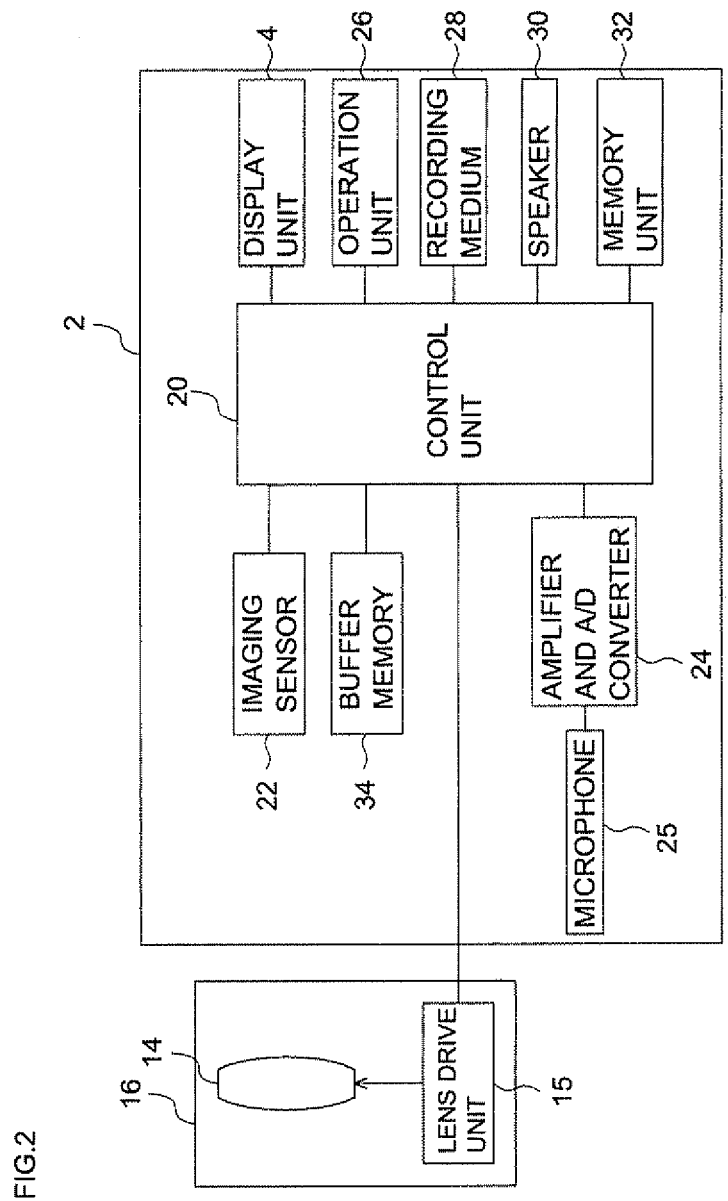
FIG. 2 is a block diagram illustrating the system configuration of the electronic camera according to the first embodiment.

FIG. 2 is a block diagram illustrating the system configuration of the electronic camera 2 according to the first embodiment. As illustrated in FIG. 2, the imaging lens 16, which is provided with a focusing lens 14 and a lens drive unit 15 or the like for driving the focusing lens 14 in the optical axis direction, is installed on the electronic camera 2. The lens drive unit 15 drives the focusing lens 14 in accordance with control from the electronic camera 2 (from the control unit 20 (described later)). Herein, the imaging lens 16 may be an interchangeable imaging lens that can be inserted to and removed from the electronic camera 2, or may be an integrated imaging lens that is fixed to the electronic camera 2.

The electronic camera 2 is provided with a control unit 20 for integrated control of each of the parts of the electronic camera 2, the control unit 20 being constituted of a microprocessor and the like. The control unit 20 is connected to the display unit 4, the imaging sensor 22, an amplifier and A/D converter 24, an operation unit 26, a recording medium 28, a speaker 30, a memory unit 32, and a buffer memory 34. The imaging sensor 22 is constituted of a CCD, a CMOS, or the like, and captures subject light via the imaging lens 16 to output an imaging signal to the control unit 20.

The control unit 20 adjusts the resolution of, and performs other forms of image processing on, the imaging signal output from the imaging sensor 22, to create image data for a still image, a movie image, and/or a through-image. In the case of a CMOS-type imaging sensor, a digital signal is directly output in some cases. The control unit 20 also detects the contrast value of the created image data and performs contrast-type auto-focusing on the basis of the detected contrast value. Specifically, the focus position is adjusted by the displacement, in the optical axis direction, of the focusing lens 14 via the lens drive unit 15.

The amplifier and A/D converter 24 converts the analog signal of the audio around the electronic camera 2 picked up by the microphone 25 to a digital signal, and outputs the converted digital audio signal to the control unit 20. The control unit 20 creates audio data from the digital audio signal output from the amplifier and A/D converter 24. The operation unit 26 is configured to include: the touch panel 5, the shutter button 6, the mode button 8, the keypad 10, the OK button 12, a power switch for turning the power of the electronic camera 2 on/off, and the like.

The recording medium 28 is a portable recording medium that can be inserted into and removed from a card slot (not shown) provided to the electronic camera 2; possible examples include a CF card, an SD card, or SmartMedia. The recording medium 28 records the movie image data and the audio data created in the control unit 20, and the like. The speaker 30 outputs audio based on the audio data recorded in the recording medium 28, as well as operation sounds, sound effects, and the like.

The memory unit 32 stores the capturing frame rate in the movie image capturing, the focus position (described later), and other parameters that are set for the through-image to be displayed on the display unit 4. Still image data, movie image data, and other information having been read from the recording medium 28 are also temporarily stored.

The buffer memory 34 temporarily stores the frame image data created on the basis of the imaging signal output from the imaging sensor 22 in a case where movie images have been captured. The buffer memory 34 also temporarily stores buffer audio data based on the audio picked up by the microphone 25 when the movie images were captured.

The control unit 20 of the electronic camera 2 according to this embodiment performs processing for linking two movie images and creating compiled movie images. The control unit 20 also performs image processing to link the movie images at the linking portions of the movie images when the compiled movie images are created.

Figure 3:
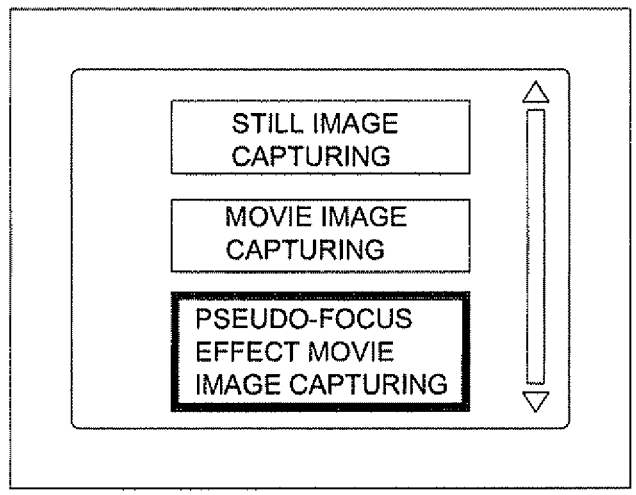
FIG. 3 is a drawing illustrating an imaging mode selection screen to be displayed on a display unit according to the first embodiment.

The following is a description of the processing in the electronic camera 2 according to the first embodiment involved in capturing movie images in a pseudo-focus effect movie image capturing mode. First, the user presses down on the mode button 8 and causes the display unit 4 to display an imaging mode selection screen. The imaging mode selection screen, as illustrated in FIG. 3, displays a "still image capturing" button for setting a still image capturing mode; a "movie image capturing" button for setting a movie image capturing mode; and a "pseudo-focus effect movie image capturing" button for setting the pseudo-focus effect movie image capturing mode. Herein, the pseudo-focus effect movie image capturing mode is a mode for capturing movie images for constituting the compiled movie images.

Figure 4:
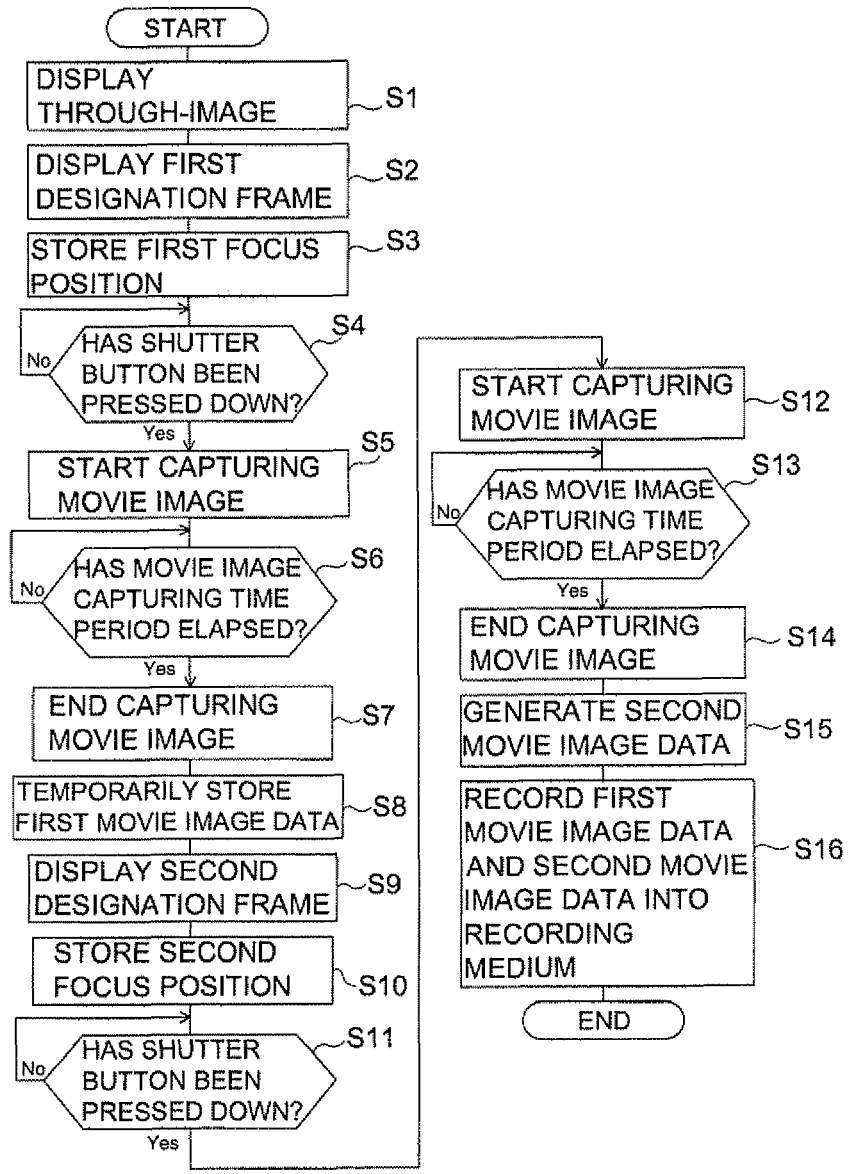
FIG. 4 is a flow chart illustrating the capturing processing for movie images in a pseudo-focus effect movie image capturing mode according to the first embodiment.

When the user selects "pseudo-focus effect movie image capturing mode" by pressing down on the keypad 10 and the OK button 12, the control unit 20 shifts to the pseudo-focus effect movie image capturing mode. FIG. 4 is a flow chart illustrating the capturing processing for movie images in a pseudo-focus effect movie image capturing mode according to the first embodiment. The control unit 20, upon shifting to the pseudo-focus effect movie image capturing mode, causes the display unit 4 to display a through-image based on the imaging signal from the imaging sensor 22 (step S1).

Figure 5:
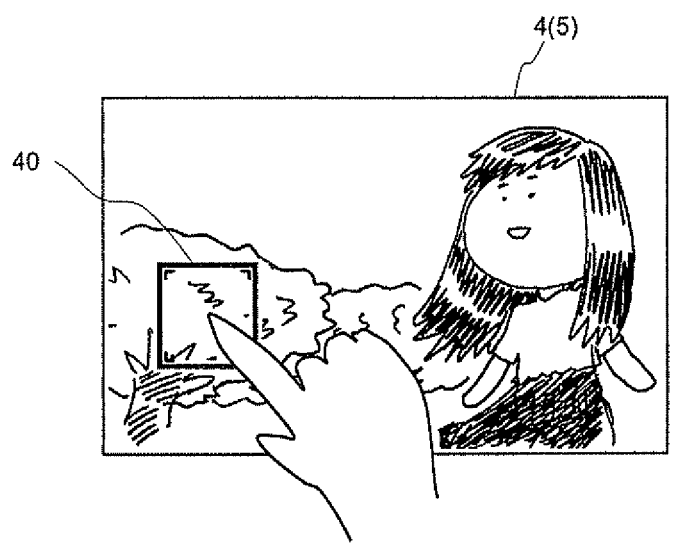
FIG. 5 is a drawing illustrating a first designation frame to be displayed on the display unit according to the first embodiment.

FIG. 5 is a drawing illustrating the through-image to be displayed on the display unit 4. The display unit 4 displays a through-image in which a person is standing at the fore and a tree is present in the background. When the user brings a finger into contact with the position of the tree in the background of the through-image displayed on the display unit 4, the contact position of the finger is detected by the touch panel 5. The control unit 20 controls so that a first designation frame 40 is displayed to be superimposed onto the tree displayed in the through-image, on the basis of the contact position detected by the touch panel 5 (step S2).

When the user presses down on the OK button 12 during this state, the control unit 20 stores, in the memory unit 32, the region in which the first designation frame 40 is displayed, as a first focus position (step S3). The control unit 20 then determines whether or not the shutter button 6 has been pressed down by the user (step S4).

In the case where the control unit 20 determines that the user has pressed down on the shutter button 6 ("Yes" in step S4), the focusing lens 14 is driven so as to focus on a region containing the tree in the background, the region being the first focus position. The control unit 20 then begins capturing movie images (step S5). Namely, the control unit 20 begins to store, on the buffer memory 34, frame image data based on the imaging signal output from the imaging sensor 22 depending on the capturing frame rate stored in the memory unit 32.

The control unit 20 determines whether or not a movie image capturing time period, e.g., four seconds, has elapsed since beginning to capture movie images (step S6). In the case where the control unit 20 determines that four seconds have elapsed ("Yes" in step S6), the storage of the frame image data in the buffer memory 34 is terminated and the capturing of movie images is terminated (step S7).

Next, the control unit 20 generates first movie image data for constituting the compiled movie images (described later) on the basis of the plurality of frame image data sets stored in the buffer memory 34. Specifically, the plurality of frame image data sets stored in the buffer memory 34 are read out and the read-out frame image data is resized to a resolution for movie images or the like, thus generating first movie image data. The control unit 20 then temporarily stores the first movie image data in the memory unit 32 (step S8).

Figure 6:
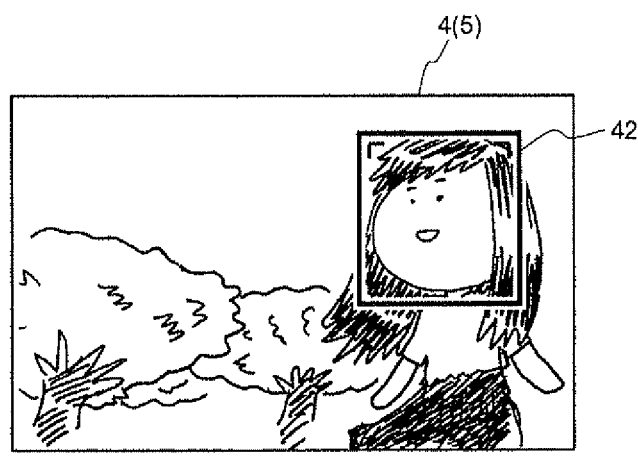
FIG. 6 is a drawing illustrating a second designation frame to be displayed on the display unit according to the first embodiment.

When the user, to set a subsequent focus position (referred to as the second focus position), brings a finger into contact with the position of the face of the person in the through-image displayed on the display unit 4, the contact position of the finger is detected by the touch panel 5. The control unit 20 controls so that a second designation frame 42 is displayed to be superimposed on the face of the person displayed in the through-image, as illustrated in FIG. 6, on the basis of the contact position detected by the touch panel 5 (step S9).

When the user presses down on the OK button 12 during this state, the control unit 20 stores, in the memory unit 32, the region in which the second designation frame 42 is displayed, as the second focus position (step S10). The control unit 20 then determines whether or not the shutter button 6 has been pressed down by the user (step S11).

In the case where the control unit 20 determines that the user has pressed down on the shutter button 6 ("Yes" in step S11), the focusing lens 14 is driven so as to focus on the region containing the face of the person, the region being the second focus position. The control unit 20 then begins capturing movie images (step S12). Namely, the control unit 20 begins to store, on the buffer memory 34, frame image data based on the imaging signal output from the imaging sensor 22 depending on the capturing frame rate stored in the memory unit 32.

The control unit 20 determines whether or not a movie image capturing time period, e.g., four seconds, has elapsed since beginning to capture movie images (step S13). In the case where the control unit 20 determines that four seconds have elapsed ("Yes" in step S13), the storage of the frame image data in the buffer memory 34 is terminated and the capturing of movie images is terminated (step S14).

The control unit 20 generates second movie image data constituting the compiled movie images (described later), on the basis of the plurality of frame image data sets stored in the buffer memory 34, using a method similar to the aforesaid generation of the first movie image data (step S15). The control unit 20 reads out the first movie image data from the memory unit 32 and records both the first movie image data and the second movie image data in the recording medium 28, as an MOV or other predetermined file format (step S16).

In such a case, the file for each of the movie images stores, as meta-data, information indicating that the movie images were captured in the pseudo-focus effect movie image capturing mode, a filename for the other movie images constituting the compiled movie images, and information indicating the display sequence. Thereafter, the user returns the capturing mode to a normal still image capturing mode or a movie image capture mode as needed, by operating the menu button 8, the keypad 10, and the OK button 12.

Figure 7:
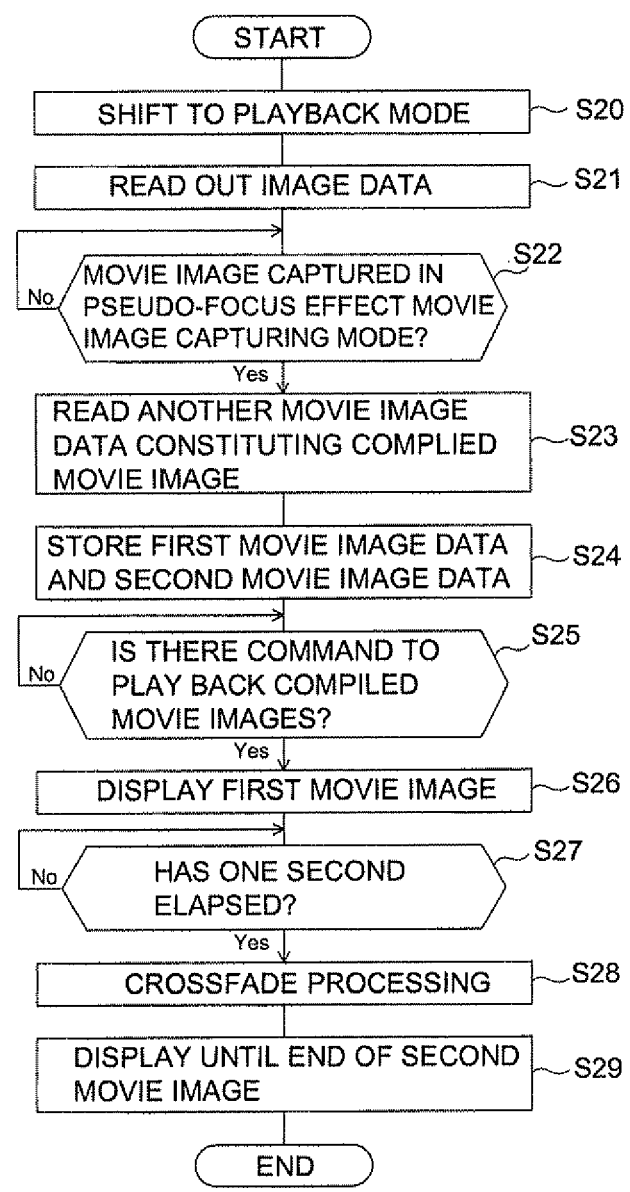
FIG. 7 is a flow chart illustrating the playback processing for compiled movie images according to the first embodiment.

The following is a description of the processing in the electronic camera 2 according to the first embodiment involved in playing back compiled movie images, with reference to the flow chart illustrating the processing for playing back compiled movie images according to this embodiment illustrated in FIG. 7. When the user presses down on the mode button 8 and selects the playback mode by pressing down on the keypad 10 and the OK button 12, the control unit 20 shifts to a playback mode for playing back still images and/or movie images based on the image data recorded in the recording medium 28 (step S20).

In the playback mode, the control unit 20 reads out still image data or movie image data in sequence from the recording medium 28 on the basis of the operation of the keypad 10 (step S21). Namely, in a case where the left arrow key of the keypad 10 has been operated, previous image data is read out from the recording medium 28 and an image based on such image data is displayed; in a case where the right arrow key of the keypad 10 has been operated, subsequent image data is read out from the recording medium 28 and an image based on such image data is displayed. In a case where, for example, the read-out image data is image data for a still image, the control unit 20 causes the display unit 4 to display a still image based on such image data. In a case where the read-out image data is image data for a movie image, the control unit 20 causes the display unit 4 to display a movie image based on such image data.

The control unit 20 determines whether or not there is stored information indicating that the movie images were captured in the pseudo-focus effect movie image capturing mode as meta-data of the movie image data read out from the recording medium 28 (step S22). In a case where there is stored meta-data indicating that the movie images were captured in the pseudo-focus effect movie image capturing mode ("Yes" in step S22), then the control unit 20 refers to the filenames of the other movie images constituting the compiled movie images stored as meta-data and reads out, from the recording medium 28, the movie image data for the other movie images (step S23). In a case where, for example, the first movie image data, which is the first in the display sequence, has been read out, then the control unit 20 refers to the meta-data and reads out, from the recording medium 28, the second movie image data, which is second in the display sequence. In a case where the second movie image data has been read out, the control unit 20 refers to the meta-data and reads out, from the recording medium 28, the first movie image data.

Figure 8:
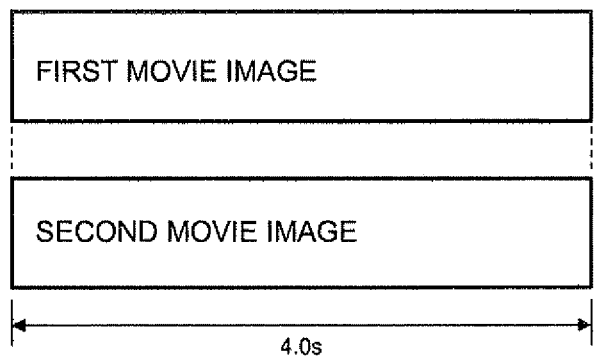
FIG. 8 is a drawing illustrating the length of a first movie image and a second movie image according to the first embodiment.

The control unit 20 stores, in the memory unit 32, the read-out first movie image data and the second movie image data (step S24). As illustrated in FIG. 8, the first movie image and the second movie image based on the first movie image data and the second movie image data constituting the compiled movie images are movie images that are each four seconds long.

Figure 10:
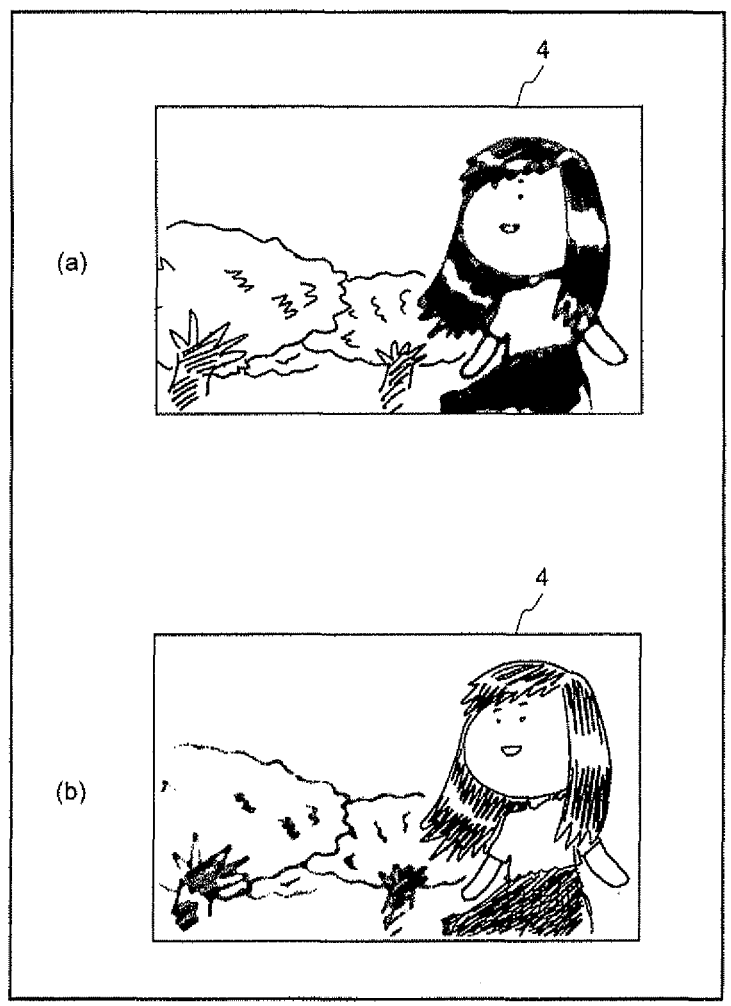
FIG. 10 is a drawing illustrating movie images to be displayed by the playback of compiled movie images.

The control unit 20 causes the display unit 4 to display, as a still image, the initial frame image of the first movie image data to be displayed initially as the compiled movie images, and determines whether or not there has been a command to play back the compiled movie images (step S25). The control unit 20 makes the determination that the user has made a command to play back the compiled movie images by operating the OK button 12 ("Yes" in step S25). In the case where there has been a command to play back the compiled movie images, the control unit 20 begins the display, on the display unit 4, of the first movie image based on the first image data stored in the memory unit 32 (step S26). Namely, as illustrated in FIG. 10A, the display of a movie image focused on the tree in the background on the basis of the first movie image data is begun.

Figure 9:
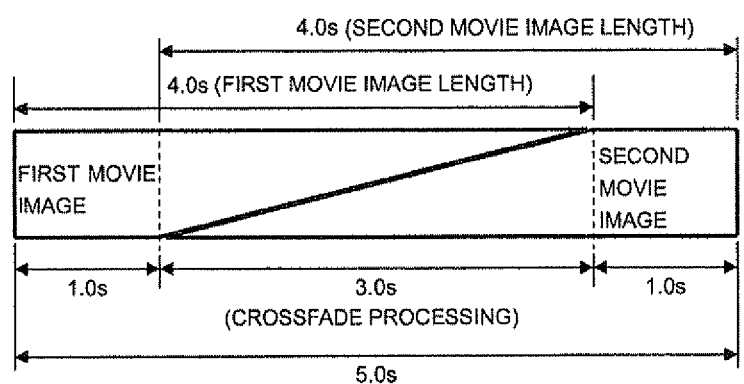
FIG. 9 is a drawing illustrating the timeline for playing back compiled movie images or for generating movie images according to the first embodiment.

The control unit 20 determines whether or not a crossfade processing start time has been reached, i.e. whether or not one second has elapsed since the display of the first movie image was started (step S27). Upon determining that the crossfade processing start time has been reached ("Yes" in step S27), the control unit 20 begins the display of the second movie image based on the second movie image data stored in the memory unit 32, and also performs crossfade processing such that the first movie image in the display gradually changes to the second movie image over a predetermined period of time (three seconds) (step S28). Namely, as illustrated in FIG. 9, only the first movie image is displayed during the initial one second, and then crossfade processing is done such that there is overlap between three seconds where the first movie image remains and the initial three seconds of the second movie image. Accordingly, during such a period, the displayed movie images appear such that the focus position gradually moves from the tree in the background to the face of the person in the fore. Then, after the crossface processing, the control unit 20 displays, for one second, a movie image where the focus is on the face of the person on the basis of the second movie image data, as illustrated in FIG. 10B (step S29). The compiled movie images are thereby played back entirely as five seconds of movie images, as illustrated in FIG. 9.

According to the first embodiment, movie images having an impressive visual effect where the focus position changes can thereby be readily created even though the user has manually operated the electronic camera and captured movie images without changing the focus position.

In the first embodiment described above, the crossfade processing is performed for three seconds, but change may be possible. In so doing, it is possible to obtain an effect equivalent to when the speed of the focus effect has been changed, and it is possible to readily alter the visual effect. When, for example, the time period for the crossfade processing is lengthened, it is possible to readily create compiled movie images appearing such that the focus position is slowly changing. When, for example, the time period for the crossfade processing is shortened, it is possible to readily create compiled movie images appearing such that the focus position is quickly changing.

According to the first embodiment described above, the compiled movie images are created when there has been a command to play back the compiled movie images in the playback mode, but there is no limitation thereto, and another possible configuration is one where the pseudo-focus effect movie image capturing mode is used to capture the first movie image and the second movie image and thereafter the compiled movie images are generated and then recorded in the recording medium 28.

According to the first embodiment described above, the initial frame image of first movie image data is displayed in the playback mode and, when the OK button 12 is operated by the user, the compiled movie images are generated and played back, but the user may be made to select whether to play back the first movie image or the second movie image separately or to play the same back as compiled movie images.

According to the first embodiment described above, the position at which the user has brought the finger into contact is detected by the touch panel 5 and the through-image displays the first designation frame or the second designation frame for determining the first focus position or the second focus position on the basis of the contact position, but there is no limitation thereto, and another possible configuration is one where a designation frame that is moved by the operation of the keypad 10 is displayed, and the first focus position and the second focus position are determined by the movement of the designation frame.

The following is a description of an electronic camera 2 according to a second embodiment. The electronic camera 2 according to this embodiment prompts the user, in the pseudo-focus effect movie image capturing mode, to continuously set two focus positions, and then continuously captures movie images focused at each of the focus positions.

Figure 11:
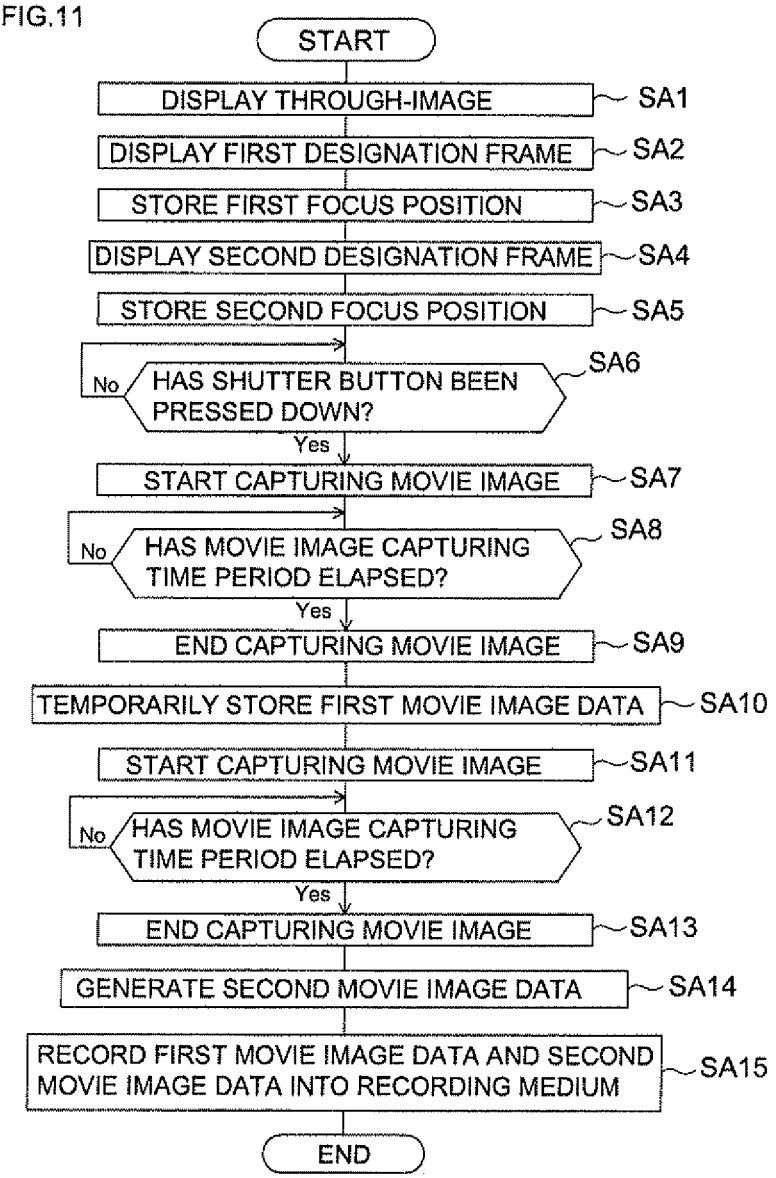
FIG. 11 is a flow chart illustrating the capturing processing for movie images in a pseudo-focus effect movie image capturing mode according to a second embodiment.

Herein, FIG. 11 is a flow chart illustrating the capturing processing for movie images in the pseudo-focus effect movie image capturing mode according to the second embodiment. When the user selects "pseudo-focus effect movie image capturing mode" by pressing down on the mode button 8, the keypad 10, and the OK button 12, the control unit 20 shifts to the pseudo-focus effect movie image capturing mode. The control unit 20 then causes the display unit 4 to display a through-image based on the imaging signal from the imaging sensor 22 (step SA1).

Figure 12:
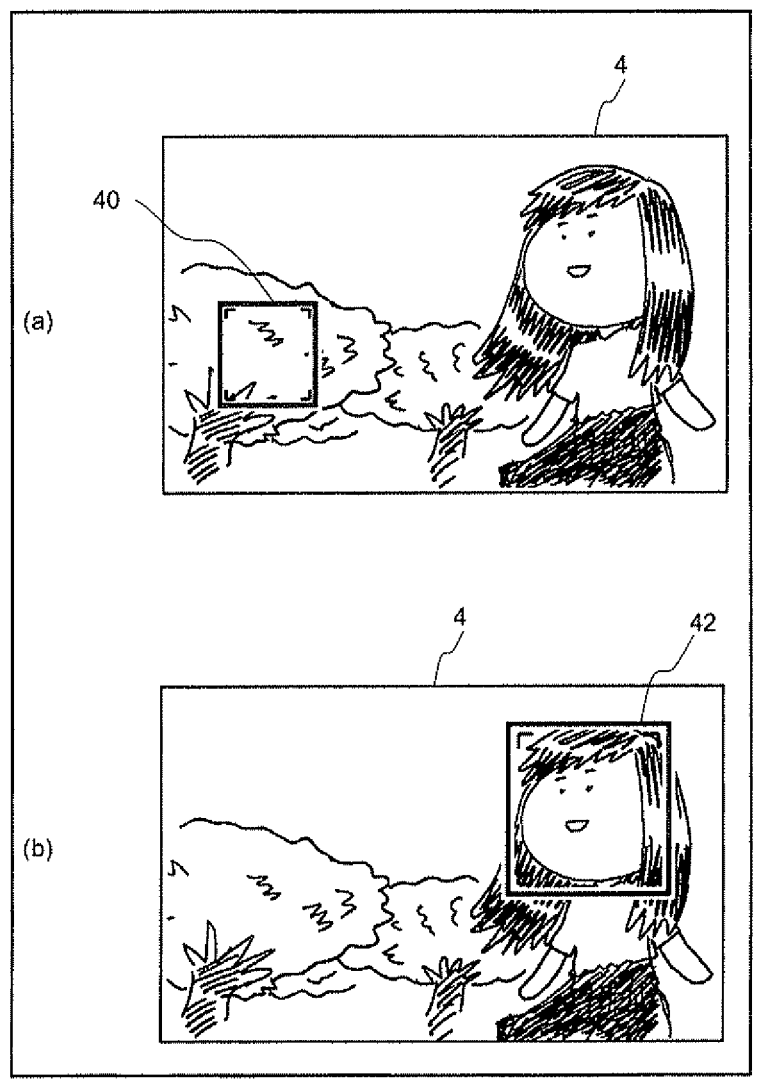
FIG. 12 is a drawing illustrating a first designation frame and a second designation frame to be displayed on a display unit according to the second embodiment.

When the user brings a finger into contact with the position of the tree in the background of the through-image displayed on the display unit 4, the contact position of the finger is detected by the touch panel 5. The control unit 20 controls so that the first designation frame 40 is displayed to be superimposed onto the tree displayed in the through-image, as illustrated in FIG. 12A, on the basis of the contact position detected by the touch panel 5 (step SA2). When the user presses down on the OK button 12 during this state, the control unit 20 stores, in the memory unit 32, the region in which the first designation frame is displayed, as a first focus position (step SA3).

Next, when the user brings a finger into contact with the position of the face of the person in the through-image displayed on the display unit 4, the contact position of the finger is detected by the touch panel 5. The control unit 20 controls so that the second designation frame 42 is displayed to be superimposed on the face of the person displayed in the through-image, as illustrated in FIG. 12B, on the basis of the contact position detected by the touch panel 5 (step SA4).

When the user presses down on the OK button 12 during this state, the control unit 20 stores, in the memory unit 32, the region in which the second designation frame is displayed, as a second focus position (step SA5). The control unit 20 then determines whether or not the shutter button 6 has been pressed down by the user (step SA6).

Figure 13:
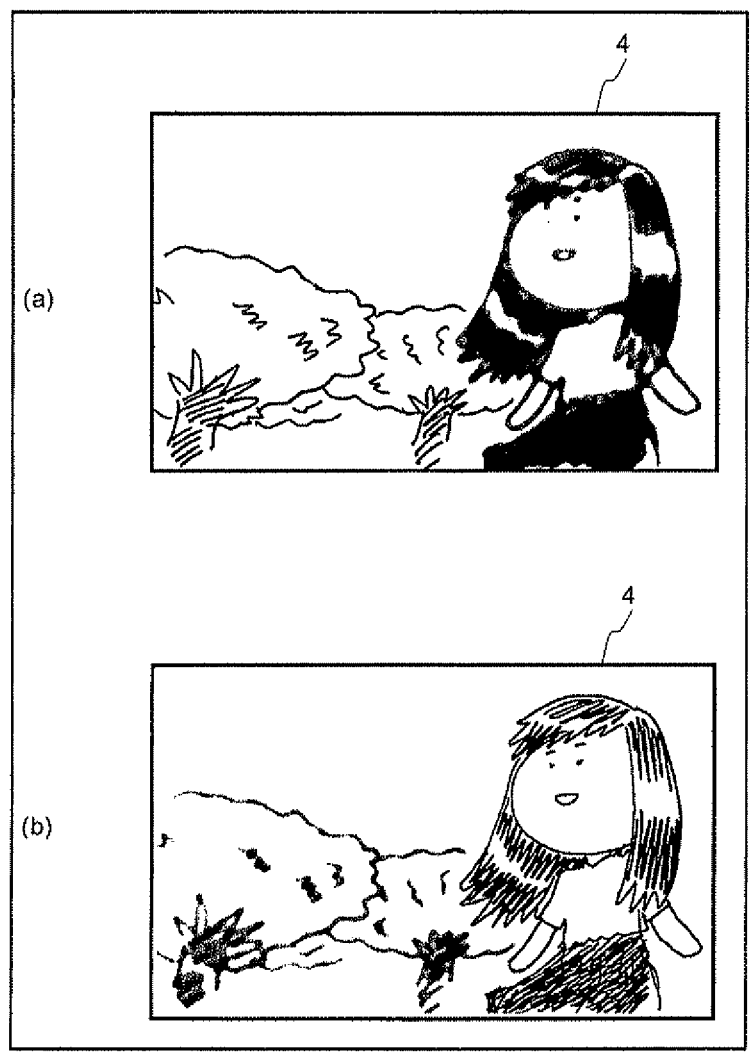
FIG. 13 is drawing illustrating a focus position which changes depending on the display of compiled movie images according to the second embodiment.

In the case where the control unit 20 determines that the user has pressed down on the shutter button 6 ("Yes" in step SA6), the first focus position is read out from the memory unit 32 and, as illustrated in FIG. 13A, the focusing lens 14 is driven so as to focus on a region containing the tree in the background, the region being the first focus position. The control unit 20 then begins capturing movie images (step SA7). Namely, the control unit 20 begins to store, on the buffer memory 34, frame image data based on the imaging signal output from the imaging sensor 22 depending on the capturing frame rate stored in the memory unit 32.

The control unit 20 determines whether or not a movie image capturing time period, e.g., four seconds, has elapsed since beginning to capture movie images (step SA8). In the case where the control unit 20 determines that four seconds have elapsed ("Yes" in step SA8), the storage of the frame image data in the buffer memory 34 is terminated and the capturing of movie images is terminated (step SA9).

Next, the control unit 20 generates first movie image data for constituting the compiled movie images on the basis of the plurality of frame image data sets stored in the buffer memory 34. Specifically, the plurality of frame image data sets stored in the buffer memory 34 are read out and the read-out frame image data is resized to a resolution for movie images or the like, thus generating first movie image data. The control unit 20 then temporarily stores the first movie image data in the memory unit 32 (step SA10).

The control unit 20 reads out the second focus position from the memory unit 32 and, as illustrated in FIG. 13B, drives the focusing lens 14 so as to focus on a region containing the face of the person, the region being the second focus position. The control unit 20 then begins capturing movie images (step SA11). Namely, the control unit 20 begins to store, on the buffer memory 34, frame image data based on the imaging signal output from the imaging sensor 22 depending on the capturing frame rate stored in the memory unit 32.

The control unit 20 determines whether or not a movie image capturing time period, e.g., four seconds, has elapsed since beginning to capture movie images (step SA12). In the case where the control unit 20 determines that four seconds have elapsed ("Yes" in step SA12), the storage of the frame image data in the buffer memory 34 is terminated and the capturing of movie images is terminated (step SA13).

The control unit 20 generates second movie image data constituting the compiled movie images on the basis of the plurality of frame image data sets stored in the buffer memory 34 (step SA14). The control unit 20 reads out the first movie image data from the memory unit 32 and assigns, to the first movie image data and the second movie image data, information indicating that the movie images were captured in the pseudo-focus effect movie image capturing mode, a filename for the other movie images constituting the compiled movie images, and meta-data indicating the display sequence, and then records the same in the recording medium 28 as a MOV or another predetermined file format (step SA15). The compiled movie images constituted of the first movie image data and the second movie image data are played back by processing similar to that of the first embodiment.

According to the second embodiment, the user is made to continuously indicate the first focus position and the second focus position, and the movie images of the first movie image data and the second movie image data are captured continuously, wherefore the user can be provided with further improved operability in capturing movie images having the impressive visual effect, it being possible to capture to two movie images merely by pressing down on the shutter button once. Also, because there is less time between when the movie image of the first movie image data is captured and when the movie image of the second movie image data is captured, it is possible to create compiled movie images giving the impression that the first movie image data and the second movie image data are more closely linked.

In each of the embodiments described above, the user is made to indicate the first focus position and the second focus position and then the first movie image data and the second movie image data are captured, but the control unit 20 may also automatically indicate the first focus position and the second focus position. In such a case, firstly, when the electronic camera 2 shifts to the pseudo-focus effect movie image capturing mode due to a user operation, the control unit 20 causes the display unit 4 to display a through-image based on the imaging signal from the imaging sensor 22. Then, when the user presses down on the shutter button 6, the control unit 20 recognizes the face of the person displayed in the through-image by a facial recognition function, and moves the focusing lens 14 with the lens drive unit to focus on a range containing the face of the person, and stores the position thereof in the memory unit 32 as the second focus position. The control unit 20 moves the focusing lens 14 with the lens drive unit 15 and, of the focus positions distal from the face of the person, stores an infinitely closer position as a first focus position in the memory unit 32. In this manner, the first focus position and the second focus position may be determined. The first movie image and the second movie image constituting the compiled movie images are thus captured in a manner similar to that of the second embodiment.

According to the second embodiment described above, the compiled movie images are created when there has been a command to play back the compiled movie images in the playback mode, but there is no limitation thereto, and another possible configuration is one where the pseudo-focus effect movie image capturing mode is used to capture the first movie image and the second movie image and thereafter the compiled movie images are generated and then recorded in the recording medium 28.

The following is a description of an electronic camera according to a third embodiment. The electronic camera according to the third embodiment has the same configuration as the configuration of the electronic camera 2 according to the first embodiment, and a description thereof has therefore been omitted; the description employs like reference numerals for like constitutional elements.

In the third embodiment, the control unit 20 drives the focusing lens 14 to focus on the first focus position in a case where the shutter button 6 is half-pressed. Then, the control unit 20 begins to store, in the buffer memory 34, frame image data based on the imaging signal output by the imaging sensor 22 depending on an capturing frame rate of 60 fps. In such a case, the control unit 20 stores, in the buffer memory 34, the data of each of the frame images as frame image data having a full-sized (e.g., 3648×2056) number of pixels, on the basis of the imaging signal from the imaging sensor 22.

The control unit 20 continues storing the frame image data until the shutter button 6 is fully pressed. Then, when the shutter button 6 is fully pressed, the control unit 20 discontinues storing the frame image data in the buffer memory 34 at 0.4 seconds after the point in time when the shutter button 6 was fully pressed.

Figure 14:
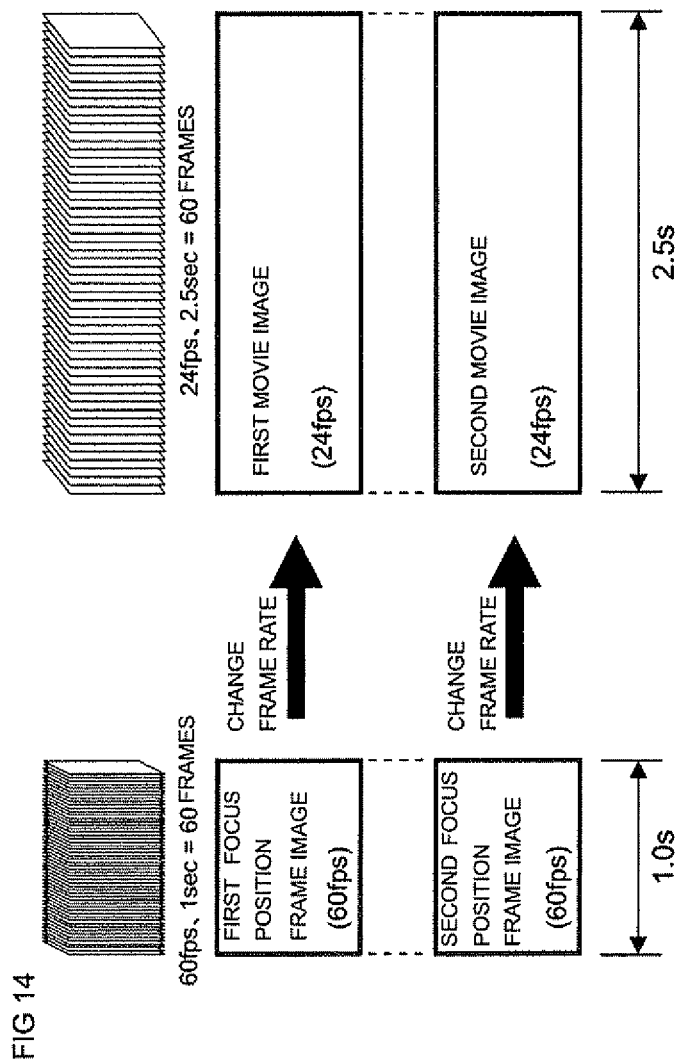
FIG. 14 is a drawing for describing the manner in which the frame rate of frame image data changes according to a third embodiment.

The control unit 20 generates first movie image data on the basis of the one second of frame image data stored in the buffer memory 34, from the 0.6 seconds prior to the time when the shutter button 6 was fully pressed to the 0.4 seconds after the time when the shutter button 6 was fully pressed. Namely, as illustrated in FIG. 14, the frame image data is read out at 24 fps from the buffer memory 34 and 2.5 seconds of first movie image data (slow-motion movie image data) are generated. In such a case, the frame image data is resized to a resolution for movie images, and the frame image data is given an HDTV-sized number of pixels (1920×1080).

The control unit 20 further generates the second movie image data (slow-motion movie image data) focused to the second focus position by a method similar to the method described above. The control unit 20 assigns, to the first movie image data and the second movie image data, information indicating that the movie images were captured in the pseudo-focus effect movie image capturing mode, a filename for the other movie images constituting the compiled movie images, and meta-data indicating the display sequence, and then records the same in the recording medium 28 in a predetermined file format.

The following is a description of the manner in which the compiled movie images are played back. In the playback mode, upon reading out, from the recording medium 28, movie image data storing meta-data that indicates that the movie images were captured in the pseudo-focus effect movie image capturing mode, the control unit 20 then refers to the filename of the other movie images constituting the compiled movie images stored as meta-data on the read-out movie image data and reads out the movie image data on the other movie images from the recording medium 28. The control unit 20 then stores, in the memory unit 32, the first movie image data and the second movie image data.

The control unit 20 refers to the information in the meta-data of the data on each of the movie images indicating the display sequence thereof, and causes the display unit 4 to display, as a still image, the initial frame image of the first movie image data to be initially displayed as the compiled movie images. Then, when the user makes a command to play back the compiled movie images by operating the OK button 12, the control unit 20 begins displaying the first movie image based on the first movie image data.

Figure 15:
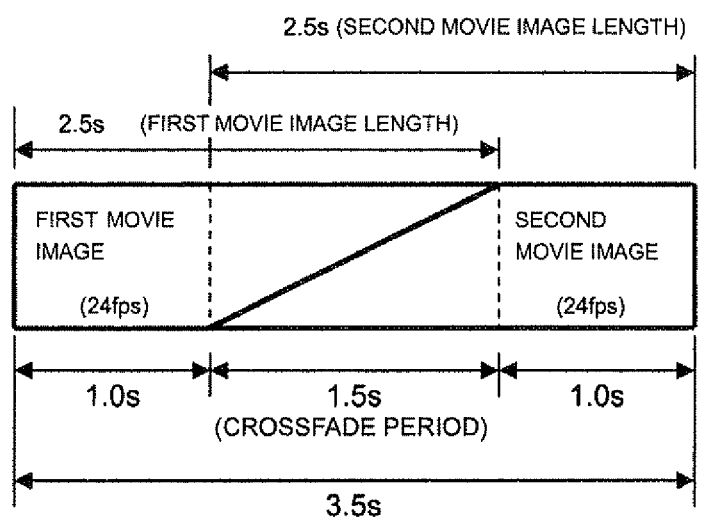
FIG. 15 is a drawing illustrating the timeline for playing back the compiled movie images or generating the movie images according to the third embodiment.

When the crossfade processing start time has been reached, i.e., when one second has elapsed since the start of the display of the first movie image as illustrated in FIG. 15, the control unit 20 begins to display the second movie image based on the second movie image data stored in the memory unit 32, and also performs crossfade processing such that the first movie image in the display gradually changes to the second movie image over a predetermined period of time (1.5 seconds). The control unit 20, after the crossfade processing, displays the second movie images until the end and then discontinues displaying the compiled movie images. The compiled movie images are thereby played back for a total length of 3.5 seconds as illustrated in FIG. 15.

According to the third embodiment, because the movie images are continuously captured for a shorted capturing time period, it is possible to approximate the circumstances of a subject of which two movie images are captured. Awkwardness when the compiled movie images are played back can accordingly be eliminated. Further, because the use of slow-motion movie images allows for a longer period of time that can be used for the crossfade processing, it is possible to readily create movie images having the impressive visual effect where the focus position changes.

According to the third embodiment, two movie images are linked to create the compiled movie images, but compiled movie images including still images may also be displayed, in order to give the impression of images of each of the focus positions of the movie images captured at the first focus position and the movie images captured at the second focus position.

Figure 16:
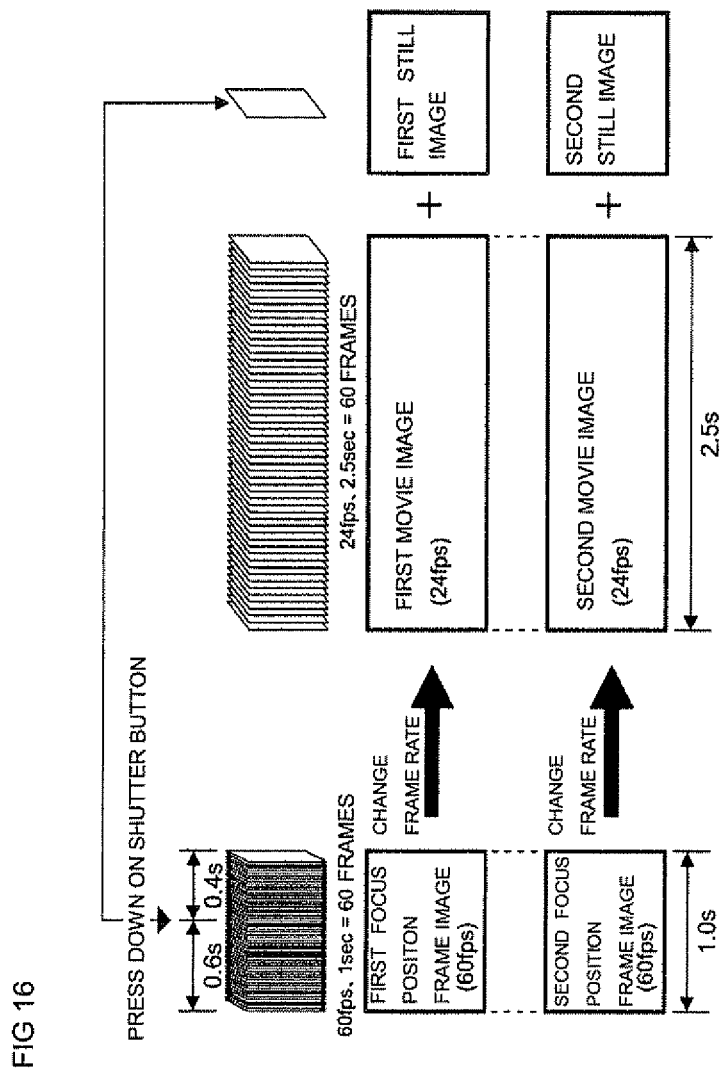
FIG. 16 is a drawing illustrating the manner in which the movie image data and the still image data are generated.

Namely, when capturing movie images and generating movie image data in the pseudo-focus effect movie image capturing mode, similar to the third embodiment, the control unit 20 acquires still image data on the basis of the imaging signal output from the imaging sensor 22. Namely, when the shutter button 6 is fully pressed to capture the first movie images, as illustrated in FIG. 16, the control unit 20 reads out, from the buffer memory 34, the frame image data based on the imaging signal output from the imaging sensor 22, and generates still image data for a first still image having a full-sized (e.g., 3648×2056) number of pixels, by performing image processing for still images. The same is then stored in the memory unit 32.

Further, when the shutter button 6 is fully pressed to capture the second movie images, as illustrated in FIG. 16, the control unit 20 reads out, from the buffer memory 34, the frame image data based on the imaging signal output from the imaging sensor 22, and generates still image data for a second still image having a full-sized number of pixels, by performing image processing for still images. The same is then stored in the memory unit 32.

The control unit 20 assigns, to each of the first movie image data, the second image movie data, the first still image data, and the second still image data stored in the memory unit 32, information indicating that the images were captured in the pseudo-focus effect movie image capturing mode, the filename of the other images constituting the compiled movie images, and meta-data indicating the display sequence; the same is then recorded in the recording medium 28.

In the case where, in the playback mode, image data storing meta-data that indicates that the images were captured in the pseudo-focus effect movie image capturing mode has been read out from the recording medium 28, the control unit 20 then refers to the filename of the other images constituting the compiled movie images stored as meta-data on the image data and reads out the image data on the other images from the recording medium 28. The control unit 20 then stores the first movie image data, the second movie image data, the first still image data, and the second still image data in the memory unit 32.

Figure 17:
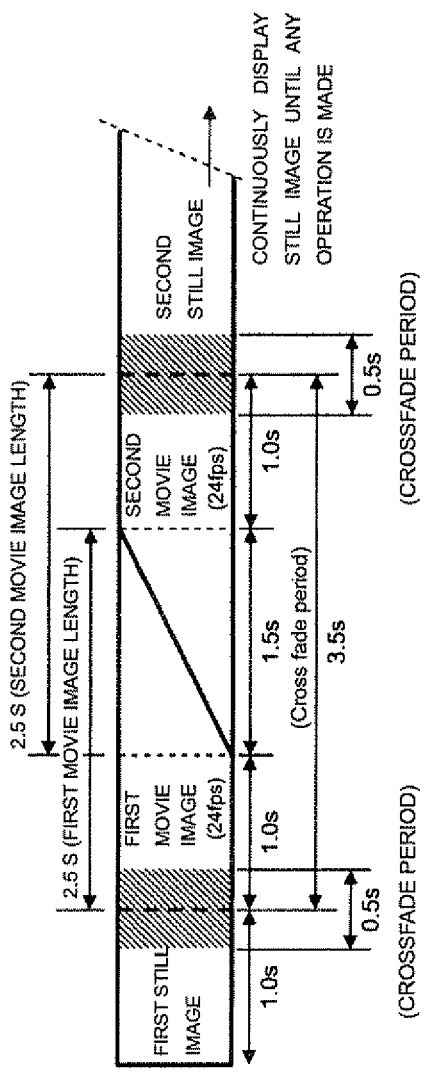
FIG. 17 is a drawing illustrating the timeline for generating the movie images or playing back the compiled movie images by which the still images are displayed.

The control unit 20 first causes the display unit 4 to display the first still image based on the first still image data. At the time of a start of the crossfade processing to the first movie image, i.e., when 0.75 seconds has elapsed since the start of the display of the first still image as illustrated in FIG. 17, the control unit 20 causes the display unit 4 to display the first movie image based on the first movie image data while also performing crossfade processing during 0.25 seconds where the first still image remains on the display and the initial 0.25 seconds of the first movie image based on the first movie image data, i.e., 0.5 seconds.

At the time of a start of the crossfade processing to the second movie image, i.e., when one second has elapsed since the start of the display of the first movie image, the control unit 20 causes the display unit 4 to display the second movie image based on the second movie image data while also performing crossfade processing during 1.5 seconds where the first movie image remains on the display.

At the time of a start of the crossfade processing to the second still image, i.e., when the time reaches 0.25 seconds prior to the end of the display of the second movie image, the control unit 20 causes the display unit 4 to display the second still image based on the second still image data while also performing crossfade processing during 0.25 seconds where the second movie image remains on the display and the initial 0.25 seconds of the second still image based on the second still image data, i.e., 0.5 seconds. The control unit 20 continuously causes the display unit 4 to display the second still image until the user makes a command to end the display or makes any other operation.

It is thereby possible to play back movie images that is long relative to the capturing time period, and the display can thereby be such that the images give the impression of the focus position of the second movie image. The first still image displayed prior to the first movie image and the second still image displayed after the second movie image are not limited to being based on the frame images as the points in time when the shutter button 6 was fully pressed, but rather may be based on a frame image selected by the user. Another possible configuration is one where the still images are displayed such that either only the first still image is displayed prior to the first movie image, or only the second still image is displayed after the second movie image.

The following is a description of a fourth embodiment. In the fourth embodiment, compiled movie images in which the movie images are linked by soft-focus processing are created. Herein, the movie image capturing time period in the pseudo-focus effect movie image capturing mode in the fourth embodiment is four seconds. The length of time for performing the soft-focus processing is three seconds, which are 1.5 seconds of the latter part of the first movie image and 1.5 seconds of the former part of the second movie image.

In a case where, in the playback mode, the movie image data read out from the recording medium 28 is movie image data which S0 has stored meta-data indicating that the movie images were captured in the pseudo-focus effect movie image capturing mode, the control unit 20 refers to the filename for the other movie images constituting the compiled movie images stored as meta-data on the read-out movie image data and reads out the movie image data on the other movie images from the recording medium 28. Namely, the control unit 20 reads out the first movie image data and the second movie image data.

The control unit 20 stores, in the memory unit 32, the read-out first movie image data and second movie image data. The control unit 20 refers to the information in the meta-data of the data on each of the movie images indicating the display sequence thereof, and causes the display unit 4 to display, as a still image, the initial frame image of the first movie image data to be initially displayed as the compiled movie images. Then, when the user makes a command to play back the compiled movie images by operating the OK button 12, the control unit 20 begins displaying the first movie image based on the first movie image data.

The control unit 20 beings the soft-focus processing when 2.5 seconds have elapsed since the start of the display of the first movie image, i.e., when the time reaches 1.5 seconds prior to the end of the display of the first movie image. The control unit 20 then gradually increases the strength of the soft-focus processing until the display of the first movie image stops. The control unit 20 begins displaying the second movie image based on the second movie image data when the display of the first movie image ends. At such a time, the control unit 20 discontinues the soft-focus processing at 1.5 seconds after the start of the display of the second movie image while also gradually weakening the strength of the soft-focus processing from the state of very strong strength of the soft-focus processing, and displays up until the end of the second movie image, then discontinuing the display of the compiled movie images.

Figure 18:
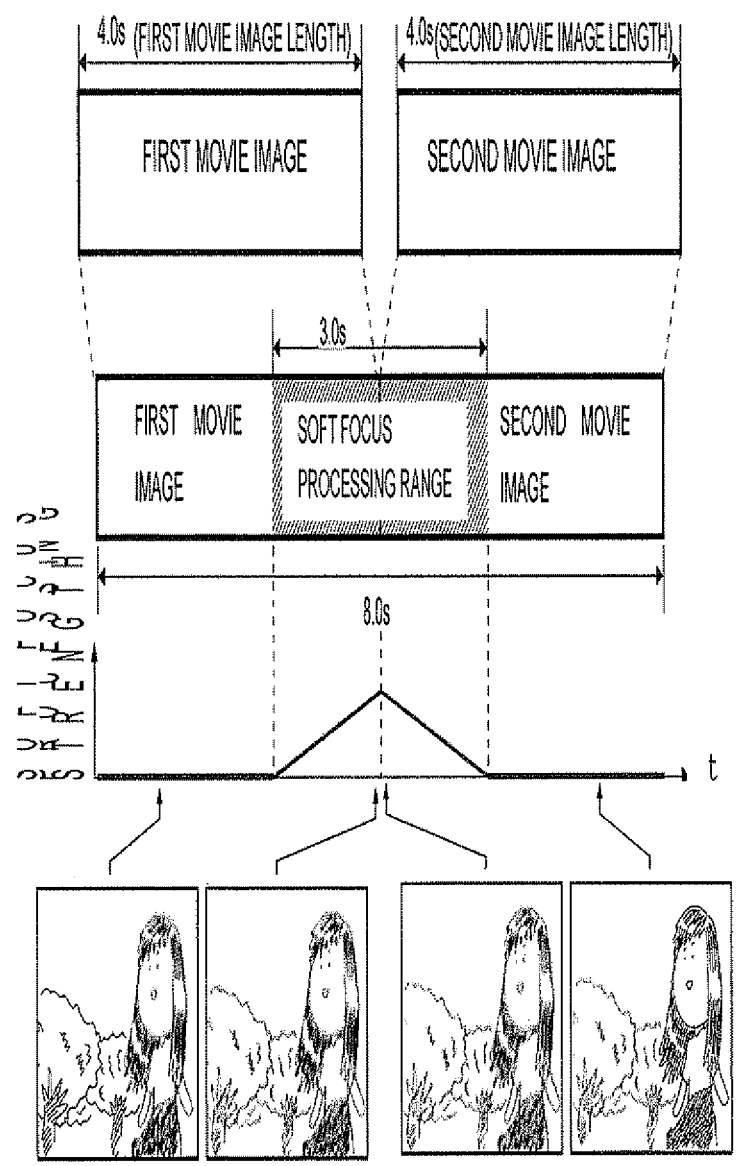
FIG. 18 is a drawing illustrating the relationship between changes in the soft-focus processing strength and the timeline for playback or for generating the movie images.

Thereby, when the playback of the compiled movie images begins as illustrated in FIG. 18, movie images focused on the tree in the background on the basis of the first movie image data are displayed until 2.5 seconds after the start, and when the soft-focus processing is begun, the strength of the soft-focus processing is gradually increased until the end of the display of the first movie image, and movie images such that the focal point does not fit anywhere are displayed. Then, the strength of the soft-focus processing is gradually weakened after the start of the display of the second movie image until the end of the soft-focus processing, thus ultimately displaying movie images focused on the face of the person based on the second movie image data. The compiled movie images are displayed as a whole as eight seconds of movie images.

The fourth embodiment also makes it possible for the user to readily create movie images having the impressive visual effect where the focus position changes, even without having captured the movie images such that the focus position changes. Further, because the first movie image and the second movie image are linked unchanged, compared to the case where the crossfade processing is performed, the need for the overlapping time periods is obviated, and it becomes possible to make more effective use of the captured movie images.

The pseudo-focus effect movie image capturing mode may also be such that the control unit 20 acquires audio from the microphone 25 while capturing the movie images focused on the first focus position and while capturing the movie images focused on the second focus position, records the audio data thereof in the recording medium 28, and uses the audio data recorded in the recording medium 28 to create compiled audio to be output from the speaker 30 when the compiled movie images are played back.

For example, the control unit 20 records audio data acquired when the movie images for generating the first movie image data are captured (referred to as the first audio data) in the recording medium 28 as audio data within the first movie image data, and records audio data acquired when the movie images for generating the second movie image data are captured (referred to as the second audio data) in the recording medium 28 as audio data within the second movie image data.

The control unit 20 also, similar to each of the embodiments described above, assigns, to the first movie image data and the second movie image data, information indicating that the movie images were captured in the pseudo-focus effect movie image capturing mode, a filename for the other movie images constituting the compiled movie images, and meta-data indicating the display sequence, and then records the same in the recording medium 28.

In the case where the first movie image and the second movie image are linked by the soft-focus processing and the compiled movie images are played back, when the read-out movie image data has stored the meta-data indicating that the movie images were captured in the pseudo-focus effect movie image capturing mode, the control unit 20 refers to the filename for the other movie images constituting the compiled movie images stored as the meta-data and reads the movie image data on the other movie images out from the recording medium 28 and stores the same in the memory unit 32.

Figure 19:
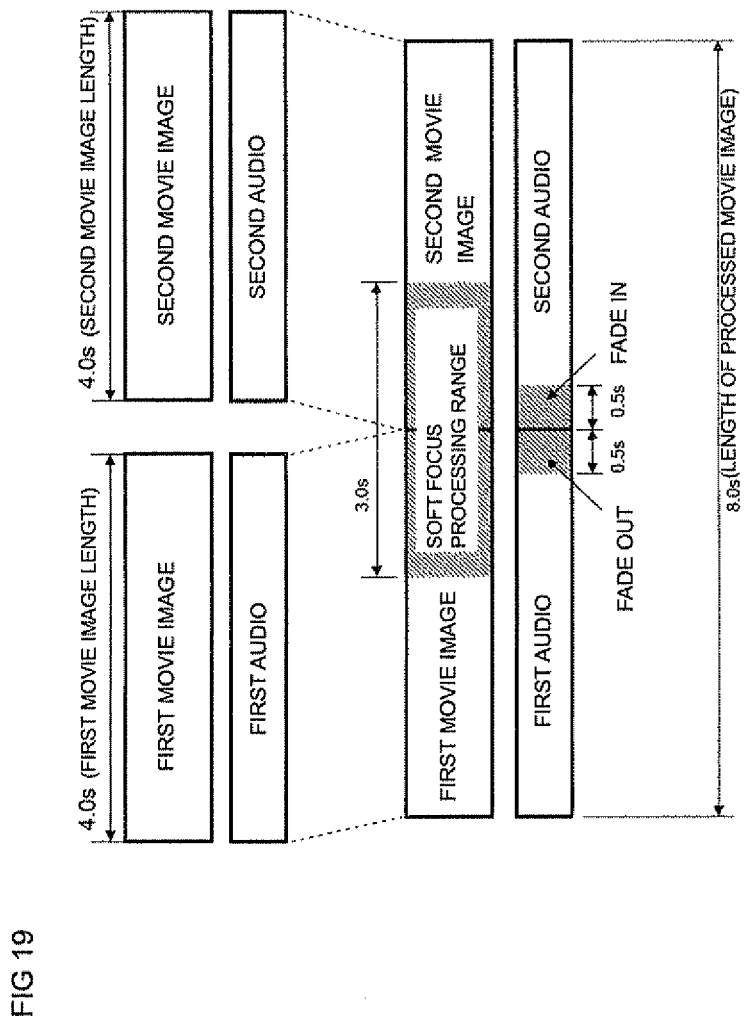
FIG. 19 is a drawing illustrating the timeline for playing back or generating the compiled movie images and the compiled audio through the soft-focus processing.

The control unit 20 then, upon causing the display unit 4 to start displaying the first movie image as illustrated in FIG. 19, causes the speaker 30 to begin outputting the first audio based on the first audio data. The control unit 20 links the first movie image and the second movie image by soft-focus processing and displays the movie images. The control unit 20 also links the first audio and the second audio by fade-out/fade-in processing and outputs the compiled audio thus created.

To that end, the control unit 20 fades out the first audio over 0.5 seconds in accordance with the timing for ending the first movie images and switching to the second movie images. The control unit 20 then outputs the second audio based on the second audio data from the speaker 30 while fading in over 0.5 seconds.

In this manner, the first audio is faded out and the second audio is faded in to link the two audios and create compiled audio, wherefore it is possible to ease the impression when the audio changes rapidly upon the switch from the first movie images to the second movie images. Further, while the first movie images and the second movie images are being captured, the focusing lens 14 is not being driven, so it is possible to prevent the sound of the focusing lens 14 being driven from entering in on the first audio and the second audio.

Figure 20:
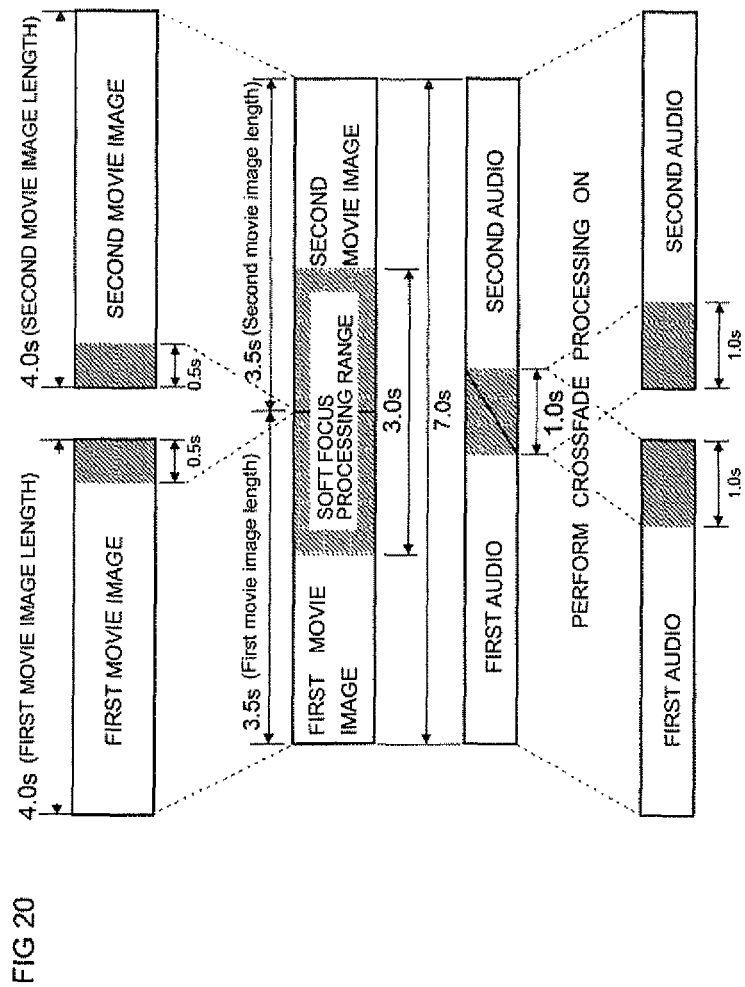
FIG. 20 is a drawing illustrating the timeline for playing back or generating the compiled movie images and the compiled audio through the soft-focus processing.

The compiled audio may also be created by crossfade processing. However, when the compiled movie images are created using soft-focus processing, the playback time period will become longer than the compiled audio created using crossfade processing. Accordingly, it is necessary to shorten the time period of the compiled movie images to match the time period of the compiled audio. For example, in a case where the time period for capturing each of the movie images is four seconds and the time period for crossfading the audio is one second, the control unit 20 removes one half of the time period for the crossfade processing, i.e., 0.5 seconds, from each of the final portion of the first movie images and the initial portion of the second movie images, thus making the length of the first movie images and the second movie images combined 3.5 seconds and linking the same by soft-focus processing as illustrated in FIG. 20. The control unit 20 also causes the speaker 30 to begin outputting the second audio from one second prior to the end of the first audio output by the speaker 30, while also performing crossfade processing.

In each of the embodiments described above, two movie images are linked to create the compiled movie images, but there is no limitation thereto, and examples of other possible configurations include linking three movie images in order to create the compiled movie images, and other pluralities of movie images that may be linked to create the compiled movie images.

Further, in the embodiments described above, a personal computer or other image play device may also be used to perform the processing for linking the first movie images and the second movie images stored in the memory medium 28 by crossfade processing or soft-focus processing, similar to the embodiments described above, and then playing back the same. Further, the audio acquired when the first movie images and the second movie images were captured may also be output when the compiled movie images are played back, similar to the embodiments described above.

In the embodiments described above, the crossfade used during the crossfade processing in which the first movie image gradually changes to the second movie image over a predetermined period of time has a constant rate of change (linear crossfade), but (non-liner crossfade, curved crossfade) having a rate of change that is not constant may also be used. Examples of non-linear (curved) crossfade include crossfade in which the rate of change depicts an S-shaped curve (S-shaped curved crossfade), crossfade depicting a Bezier curve, or crossfade depicting a parabola (parabolic crossfade). The user may also be made to select whether the aforesaid linear crossfade or the non-linear crossfade is to be used.

Further, in the case of the soft-focus processing illustrated in the fourth embodiment describe above, it may also be possible to appropriately set or alter the parameters relating to the soft-focus processing. For example, the configuration may be such that the user can appropriately set the length of time for performing the soft-focus processing, the degree thereof (the strength of the soft-focus processing), the speed (rate) of change in the processing intensity during the time period for performing the soft-focus processing, or the like. In so doing, it may also be possible to independently set such parameters for each of the first movie image data and the second movie image data.

The above-described embodiments have been recited in order to facilitate understanding of the present invention, and are not recited in order to limit the present invention. Accordingly, in effect, each element disclosed in the above-described embodiments also includes all design changes and equivalents falling within the technical scope of the present invention.

The invention claimed is:

1. An imaging device, comprising:
    an imaging sensor that captures subject light;
    a display unit that displays a through-image based on an imaging signal supplied from the imaging sensor;
    a movie image generation unit that generates a first movie image focused to a first region set in the through-image displayed on the display unit based on the imaging signal supplied from the imaging sensor, and subsequently generates a second movie image focused to a second region, which is different from the first region, set in the through-image displayed on the display unit based on the imaging signal supplied from the imaging sensor;
    an image processing unit that performs image processing in linking portions of each of the movie images in order to link the first movie image and the second movie image in time sequence of each movie image generated by the movie image generation unit to generate compiled movie images; and
    a display control unit that controls the display unit to display the compiled movie images.

2. The imaging device according to claim 1, wherein the image processing unit performs crossfade processing on the linking portions of each of the movie images.

3. The imaging device according to claim 1, wherein the image processing unit performs soft-focus processing on the linking portions of each of the movie images.

4. The imaging device according to claim 1, further comprising:
    a setting unit that sets the first and second regions in the through-image displayed on the display unit, wherein
    the movie image generation unit generates a corresponding one of the first and second movie images focused to a corresponding one of the set first and second regions each time the setting unit sets the corresponding one of the first and second regions.

5. The imaging device according to claim 1, further comprising:
    a setting unit that sets the first and second regions in the through-image displayed on the display unit, wherein
    the movie image generation unit generates, in succession, the first and second movie images each focused to a corresponding one of the set first and second regions after both of the first and second regions have been set by the setting unit.

6. The imaging device according to claim 5, further comprising:
a detection unit that detects at least two regions containing a subject or a background in the through-image displayed on the display unit, wherein
the setting unit sets the first and second regions based on the regions detected by the detection unit.

7. The imaging device according to claim 1, wherein the movie images generated by the movie image generation unit are slow-motion movie images captured by the imaging sensor at a first frame rate and then played back at a second frame rate slower than the first frame rate.

8. The imaging device according to claim 1, further comprising:
a still image generation unit that generates a final still image based on the imaging signal supplied from the imaging sensor when the final movie image positioned at the end of the compiled movie images is captured, wherein
the image processing unit performs image processing on linking portions of the final movie image and the final still image in order to link the final still image after the final movie image to create the compiled movie images.

9. The imaging device according to claim 8, wherein
the still image generation unit generates a first still image based on the imaging signal supplied from the imaging sensor when the first movie image positioned at the start of the compiled movie images is captured, and
the image processing unit performs image processing on linking portions of the first still image and the first movie image in order to link the first still image prior to the first movie image to create the compiled movie images.

10. The imaging device according to claim 1, further comprising:
an audio acquisition unit that respectively acquires first and second audio data when the first and second movie images constituting the compiled movie images are captured;
an audio processing unit that performs audio processing on linking portions of each of the first and second audio data in order to link the first and second audio data acquired by the audio acquisition unit to create compiled audio data; and
an audio output unit that outputs the compiled audio data when the compiled movie images are displayed.

11. The imaging device according to claim 10, wherein the audio processing unit performs crossfade processing on the linking portions of each of the first and second audio data.

12. The imaging device according to claim 10, wherein the audio processing unit performs fade-out processing and fade-in processing on the linking portions of each of the first and second audio data.

* * * * *